United States Patent [19]

Ozawa

[11] Patent Number: 5,305,332
[45] Date of Patent: Apr. 19, 1994

[54] SPEECH DECODER FOR HIGH QUALITY REPRODUCED SPEECH THROUGH INTERPOLATION

[75] Inventor: Kazunori Ozawa, Tokyo, Japan

[73] Assignee: NEC Corporation, Tokyo, Japan

[21] Appl. No.: 707,361

[22] Filed: May 28, 1991

[30] Foreign Application Priority Data

May 28, 1990 [JP] Japan .................. 2-135273

[51] Int. Cl.[5] .................. G06F 11/10; H04L 1/00
[52] U.S. Cl. .................. 371/31; 381/46
[58] Field of Search .................. 371/31; 381/31, 46

[56] References Cited

U.S. PATENT DOCUMENTS

| | | | |
|---|---|---|---|
| 4,224,689 | 9/1980 | Sundberg | 371/6 |
| 4,375,581 | 3/1983 | Jayant | 371/31 |
| 4,430,736 | 2/1984 | Scholz | 371/31 |
| 4,639,920 | 1/1987 | Kaneko | 371/31 |
| 4,688,224 | 8/1987 | Dal Degan et al. | 371/31 |
| 4,831,624 | 5/1989 | McLaughlin et al. | 371/31 |
| 4,918,729 | 4/1990 | Kudoh | 381/36 |
| 5,031,218 | 7/1991 | Galand et al. | 381/46 |
| 5,148,487 | 9/1992 | Nagai et al. | 381/46 |

FOREIGN PATENT DOCUMENTS 0342687 11/1989 European Pat. Off. .
0360265 3/1990 European Pat. Off. .

OTHER PUBLICATIONS

Manfred R. Schroeder et al., "Code-Excited Linear Prediction (CELP): High-Quality Speech at Very Low Bit Rates", CH2118-8/85/0000-0937, 1985 IEEE, pp. 937-940.

Yasuo Hirata et al., "Application of Forward Error Correction and Voice Coding Techniques to Satellite Communication Systems", KDD R & D Laboratories, IT84-30, pp. 1-8.

Richard V. Cox et al., "Robust Celp Coders for Noisy Backgrounds and Noisy Channels", CH2673-2/89/00-00-0739, 1989 IEEE, pp. 739-742.

W. B. Kleijn et al., "Improved Speech Quality and Efficient Vector Quantization in Selp", CH2561-9/88/0000-0155, 1988 IEEE, pp. 155-158.

Primary Examiner—Charles E. Atkinson
Attorney, Agent, or Firm—Sughrue, Mion, Zinn, Macpeak & Seas

[57] ABSTRACT

A speech decoder includes a separating circuit, an error correction decoding circuit, an interpolating circuit, and a speech reproducing circuit. The separating circuit separates a code string of a filter parameter, a code string of a parameter associated with a pitch, and a code string of a parameter associated with an index and a gain of a codebook representing an excitation signal of speech from a received code string. The error correction decoding circuit detects a transmission error, which cannot be corrected, in the received code string. When a transmission error which cannot be corrected is detected, the interpolating circuit interpolates between parameters of past and future proper frames, thereby recovering parameters of a current frame. The speech reproducing circuit reproduces a speech signal on the basis of the interpolated parameters and other received codes.

4 Claims, 4 Drawing Sheets

SPEECH DECODER FOR HIGH QUALITY REPRODUCED SPEECH THROUGH INTERPOLATION

BACKGROUND OF THE INVENTION

The present invention relates to a speech decoder for properly transmitting and decoding speech signals through a transmission path, e.g., a radio transmission path, in which errors tend to occur.

As a method for coding speech signals at low bit rates of about 8 to 4.8 kb/s, a CELP (Code Excited LPC Coding) method is known, which is described in, e.g., M. Schroeder and B. Atal, "Code-excited linear prediction: High-quality speech at very low bit rates" Proc. ICASSP, pp. 937-940, 1985 (reference 1). According to this method, on the transmission side, a spectrum parameter representing the spectrum characteristics of a speech signal is extracted from a speech signal of each frame (e.g., 20 ms). The frame is divided into subframes (e.g., 5 ms), and a pitch parameter representing a long-term correlation (pitch correlation) is extracted from a past excitation signal in units of subframes. Long-term prediction of speech signals in the subframes is performed using the pitch parameter to obtain a difference signal. For the difference signal obtained by long-term prediction, one type of noise signal is selected so as to minimize the differential power between the speech signal and a signal synthesized by a signal selected from a codebook constituted by predetermined types of noise signals. In addition, an optimal gain is calculated. Subsequently, an index representing the type of selected noise signal and the gain are transmitted together with the spectrum parameter and the pitch parameter.

On the reception side, speech is reproduced using the received parameters.

In the conventional method in reference 1 described above, when no errors are present in a transmission path, high-quality speech signals can be reproduced. If, however, transmission path errors frequently occur as in a radio transmission path, the sound quality of reproduced speech is considerably deteriorated. As an example, in a mobile telephone, burst errors tend to occur due to fading and the like, and the bit error rate is as large as 1% to 3%, thus greatly deteriorating the quality of reproduced speech. In such a transmission path in which errors tend to occur, a forward error correction code (FEC) is used to protect the transmitted parameters. Furthermore, in order to deal with burst errors, an error detection code (e.g., a CRC code) is used. This error detection code serves to detect an error, which exceeds the correction capacity of the FEC, on the reception side. These error correction codes are described in detail in, e.g., Hirata et al., "Application of Forward Error Correction and Voice Coding Techniques to Satellite Communication Systems : Current Trend and Future Technical Problems", Material for Theoretical Research Meeting of the Institute of Electronics and Communication Engineers of Japan, IT84-30, pp. 1-8, 1984 (reference 2).

In the conventional speech decoding method, when an error exceeding the correction capacity of the FEC is detected by an error detection code on the reception side, the received parameter of a frame in which the error is detected is replaced with a parameter properly received in the past. More specifically, in such a frame, speech is decoded by repeatedly using a parameter properly received in the past. Such a decoding method is described in detail in, e.g., R. V. Cox et al., "Robust CELP Coders for Noisy Backgrounds and Noisy Channels", Proc. ICASSP89, pp. 739-742, 1989 (reference 3). Although the speech decoding method described in reference 3 is simple, since it repeatedly uses a past parameter, the sound quality of speech may deteriorate or abnormal sounds may be generated in frames in which the characteristics of speech signals are changed, especially at transitions, due to the repetitive use of the parameter.

SUMMARY OF THE INVENTION

It is an object of the present invention to provide a speech decoder which can obtain high-quality reproduced speech with only a slight deterioration in sound quality due to transmission path errors.

It is another object of the present invention to provide a speech decoder which can prevent a deterioration in sound quality and generation of abnormal sounds even in frames in which the characteristics of speech signals are changed, e.g., at transitions and the like.

In order to achieve the above objects, according to the present invention, there is provided a speech decoder comprising separating means for separating a code string of a filter parameter, a code string of a parameter associated with a pitch, and a code string of a parameter associated with an index and a gain of a codebook representing an excitation signal of speech from a received code string, error correction decoding means for detecting a transmission error, which cannot be corrected, in the received code string, interpolating means for, when a transmission error which cannot be corrected is detected, interpolating between parameters of past and future proper frames, thereby recovering parameters of a current frame, and speech reproducing means for reproducing a speech signal on the basis of the interpolated parameters and other received codes.

An operation of the speech decoder of the present invention will be described below.

According to the first aspect of the present invention, in a frame in which an error exceeding the correction capacity of the FEC is detected, interpolation of parameters received by the following method is performed. According to the CELP method in reference 1, the received parameters are: a filter parameter representing the spectrum of a speech signal, information representing the power of speech, delay information representing a pitch period, a pitch gain, the index of a codebook representing an excitation signal, and the gain of the codebook. Of these parameters, especially the filter parameter and the delay information are interpolated to smoothly change because they influence sound quality.

Assume that an error is detected in the Lth frame. If the ith filter parameter of the Lth frame is represented by $A_{iL}$, and delay information is represented by $D_L$, the parameters of the Lth frame are interpolated as follows:

$$A_{iL} = \delta A_{i(L-1)} + (1-\delta) A_{i(L+1)} \qquad (1)$$

$$D_L = \delta D_{L-1} + (1-\delta) D_{L+1} \qquad (2)$$

where $\delta$ is a positive value smaller than 1.

With this operation, important parameters are interpolated and recovered on the basis of the information of past and future frames, thereby reproducing a speech signal.

In the second aspect of the present invention, in addition to the operation in the first aspect, in order to prevent propagation of the influences of an error from a frame in which the error occurs to a future frame, at least one of weighting of a filter parameter and control of a gain is performed by a predetermined number of frames starting from the frame in which the error is detected or is performed until a predetermined condition is satisfied.

In this case, the weighting of the filter parameter is performed according to the following equation:

$$a_{iL} = \gamma^i \cdot a_{iL}' \tag{3}$$

where $0 < \gamma < 1$ (as $\gamma$ becomes closer to 0, the weighted value is increased), and $a$ is the linear prediction coefficient of the Lth frame.

Gain control is performed in the following manner. Assume that an excitation signal in the Mth frame is represented by e(n); a reproduced signal, s(n); its power, Q; and, a gain in gain control for the excitation signal, G. In this case, $$e'(n) = G \cdot e(n) \tag{4}$$

The gain G is given by $$G = \begin{cases} 1.0 & (Q < P_L) \\ \sqrt{P/Q} & (Q \geq P_L) \end{cases} \tag{5}$$

In addition, the speech power $P_L$ is logarithmically interpolated in accordance with equation (3) as follows:

$$\log P_L = \delta \log P_{L-1} + (1-\delta) \log P_{L+1} \tag{6}$$

When gain control is to be performed for the reproduced signal, the following equation is used:

$$s(n) = \delta s(n-1) + ) 1 - \delta) \cdot G \tag{7}$$

DESCRIPTION OF THE PREFERRED EMBODIMENTS

Figure 1:
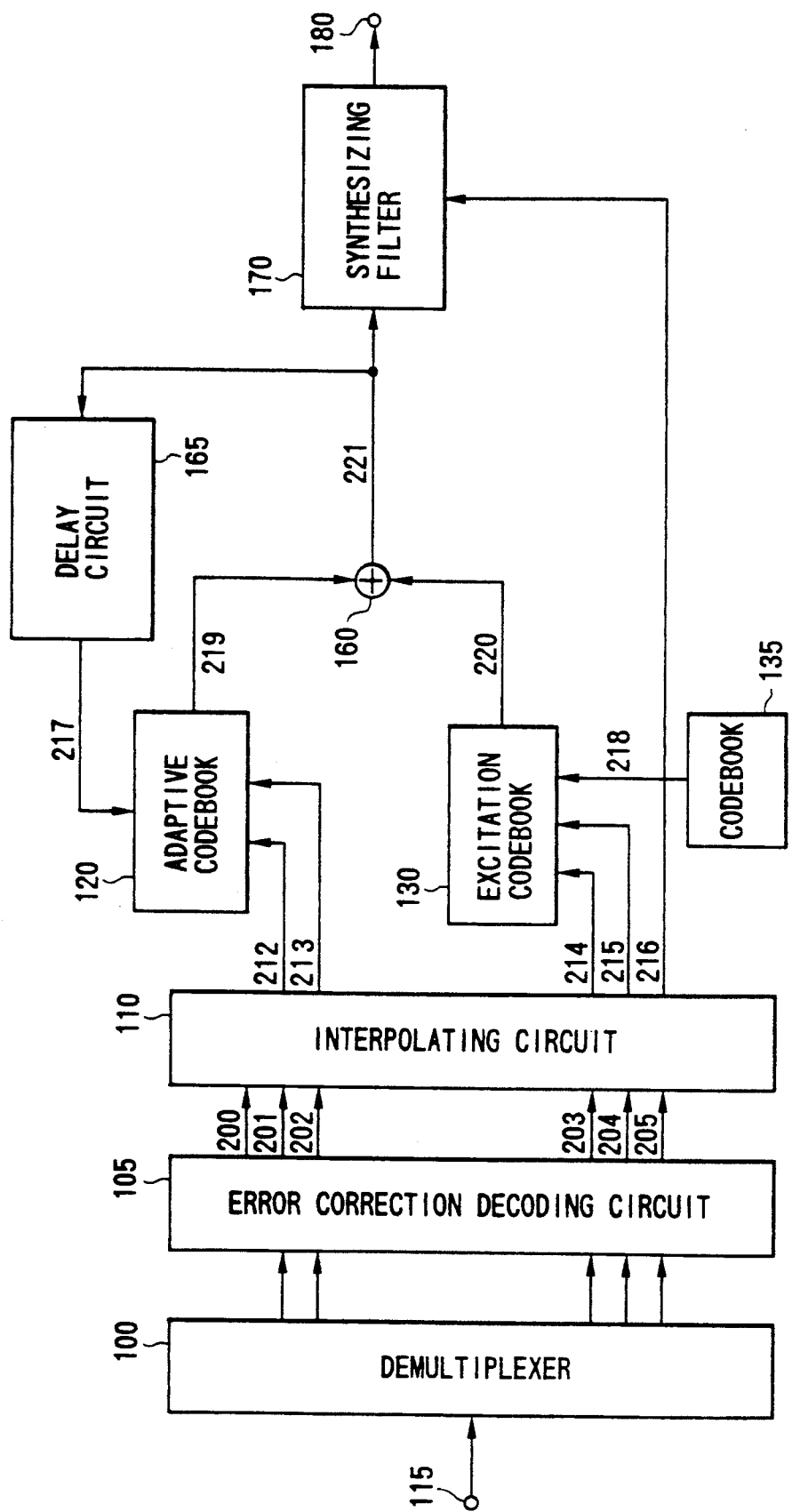
FIG. 1 is a block diagram showing a speech decoder for realizing a speech decoding method according to an embodiment of the present invention.

FIG. 1 shows a speech decoder used in a speech decoding method according to an embodiment of the present invention.

Referring to FIG. 1, upon reception of a code string from a transmission path through an input terminal 115, a demultiplexer 100 separates the following parameters from the code string: a filter parameter, delay information representing a pitch period, a pitch gain, the index of a codebook representing an excitation signal, and the gain of the codebook, and outputs them to an error correction decoding circuit 105. Upon reception of the code string of the respective parameters, the error correction decoding circuit 105 outputs the code string after error correction is performed with respect to the parameters to which error correction codes are respectively added. If an error which cannot be corrected by an error detection code is detected, the error correction decoding circuit 105 outputs error detection information to an interpolating circuit 110 through a line 200. Upon reception of the error detection information from the error correction decoding circuit 105, the interpolating circuit 110 interpolates delay information representing a pitch period and a filter parameter between a proper past frame and a proper future parameter by using equations (1) and (2) above, and outputs the interpolated parameters.

Figure 3:
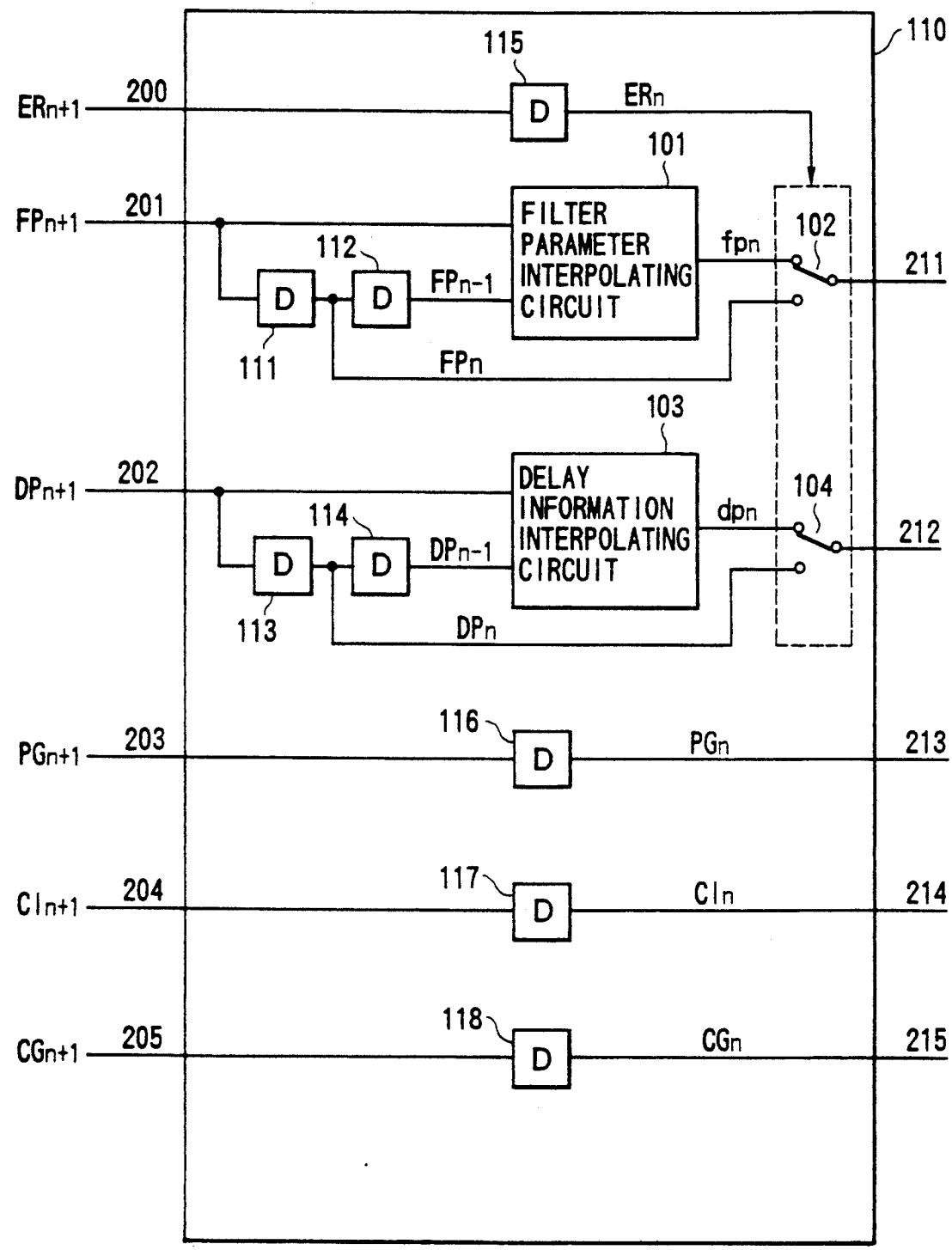
FIG. 3 is a block diagram showing an interpolating circuit in the embodiment shown in FIG. 1.

FIG. 3 is a block diagram showing the interpolating circuit 110 in the embodiment shown in FIG. 1. Error detection information $ER_{n+1}$, a filter parameter $FP_{n+1}$, delay information $DP_{n+1}$, a pitch gain $PG_{n+1}$, an index $CI_{n+1}$ of a codebook, and a gain $CG_{n+1}$ are input from the error correction decoding circuit 105 to the interpolating circuit 110 through lines 200 to 205. Each of delay circuits 111 to 118 outputs a corresponding input parameter with a delay corresponding to one frame. Upon reception of error detection information, a filter parameter interpolating circuit 101 interpolates the input filter parameter $FP_{n+1}$ with an output $FP_{n-1}$ from the delay circuit 112 according to equation (1), and outputs an interpolation result $fp_n$ to a line 211 through a switch 102. Similarly, a delay information interpolating circuit 103 outputs interpolated delay information $dp_n$ to a line 212 through a switch 104.

If no error detection information is input, a filter parameter $FP_n$, delay information $DP_n$, a pitch gain $PG_n$, an index $CI_n$ of a codebook, and a gain $CG_n$ of the codebook, each of which is only delayed by a period of time corresponding to one frame by a corresponding one of the delay circuits 111, 113, and 116 to 118, are output to lines 211 to 215, respectively.

An adaptive codebook 120 receives delay information 212, a pitch gain 213, and an output signal 217 from a delay circuit 165 and calculates a prediction signal 219. This calculation method is described in detail in, e.g., Klein, "Improved speech quality and efficient vector quantization in SELP", Proc. ICASSP, pp. 155-158, 1900 (reference 4).

An excitation codebook 130 receives a codebook index 214 and reads out a corresponding code vector 218 from a codebook 135. The codebook 130 then multiplies the code vector 210 by a code vector gain 215, and outputs an excitation signal 220. For a detailed description of an operation of the excitation codebook, reference 1 and the like can be referred.

An adder 160 adds the prediction signal 219 from the adaptive codebook 120 to the excitation signal 220 from the excitation codebook 130, and outputs the sum to a synthesizing filter 170.

The synthesizing filter 170 receives a filter parameter 216 from the interpolating circuit 110, and an excitation signal 221 from the adder 160, thus reproducing speech. The reproduced speech signal is output from a terminal 180. For a detailed description of an operation of the synthesizing filter 170, references 1 and 4 and the like can be referred.

Figure 2:
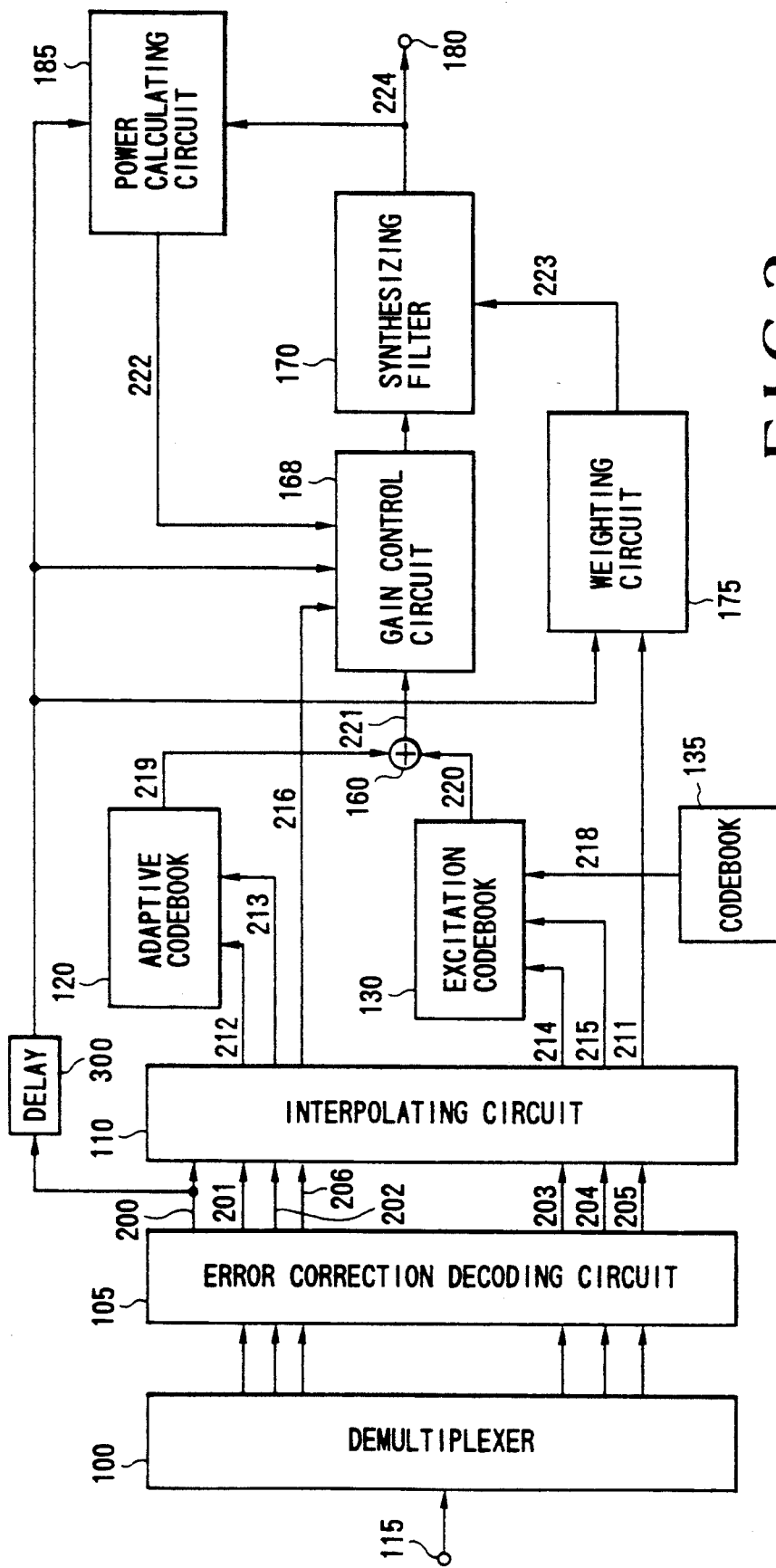
FIG. 2 is a block diagram showing a speech decoder for realizing a speech decoding method according to another embodiment of the present invention.

FIG. 2 is a block diagram showing a speech decoder used in another embodiment of the present invention. Since the parts denoted by the same reference numerals in FIGS. 1 and 2 are operated in the same manner, a description thereof will be omitted.

Referring to FIG. 2, a demultiplexer 100 separates information representing the power of speech from received code string and outputs it to an error correction decoding circuit 105. The error correction decoding circuit 105 corrects the received information as needed, and outputs it to an interpolating circuit 110 through a line 206.

Figure 4:
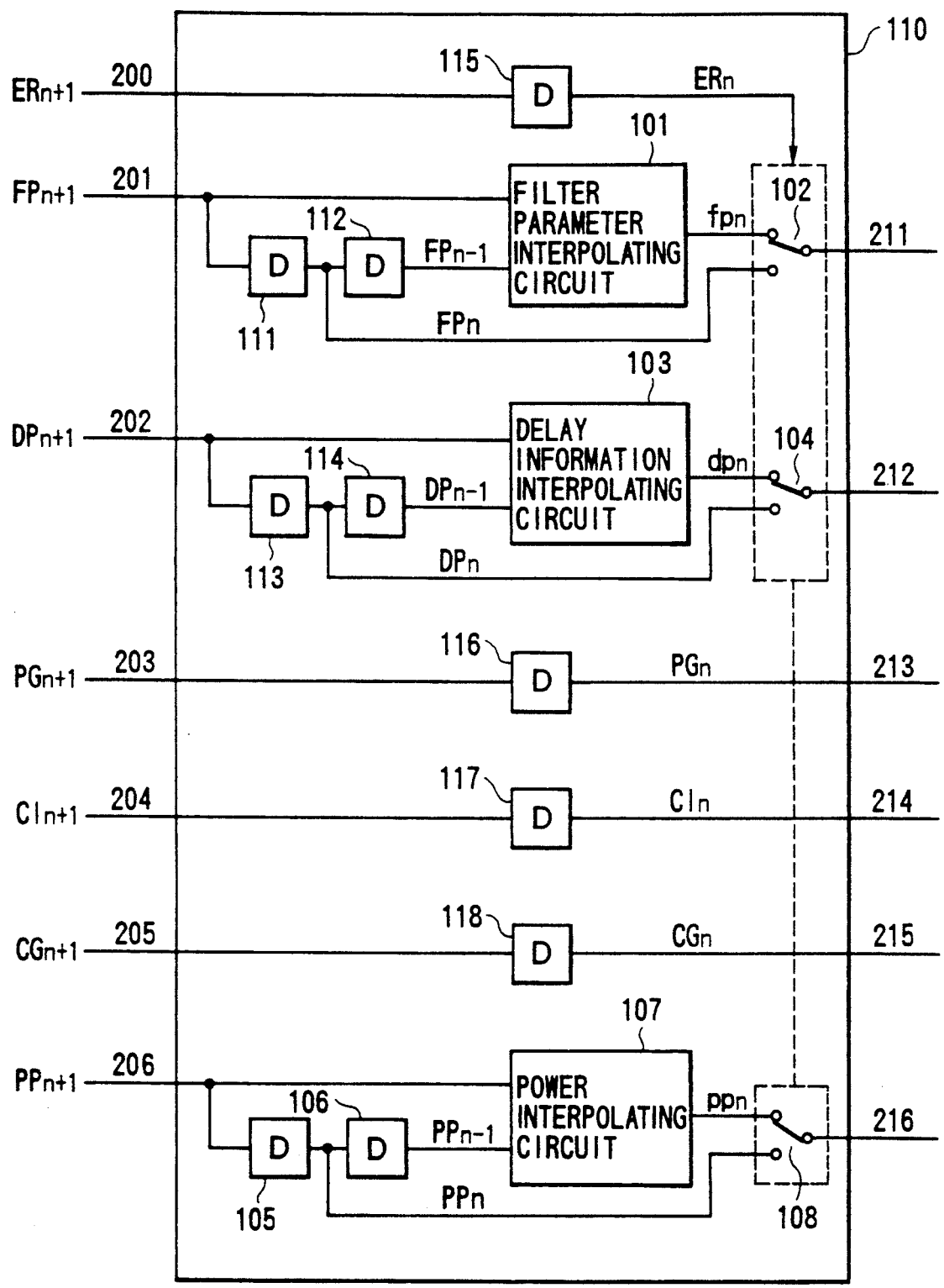
FIG. 4 is a block diagram showing an interpolating circuit in the embodiment shown in FIG. 2.

FIG. 4 is a block diagram of the interpolating circuit 110 in the embodiment shown in FIG. 2. Upon reception of error detection information, a power interpolating circuit 107 interpolates power $PP_{n+1}$ input from the line 206 with an output $PP_{n-1}$ from delay circuits 105 and 106 according to equation (6), and outputs interpolated power information $PP_n$ to a gain control circuit 168 through a switch 108 and a line 216.

The gain control circuit 168 receives error detection information from the error correction decoding circuit 105 through a delay circuit 300. If the information indicates that an error is detected, the circuit 168 performs gain control of an input signal from a synthesizing filter 170, i.e., an excitation signal 221 from an adder 160, in a predetermined number of frames starting from the frame in which the error is detected. The gain control is performed in accordance with equations (4) and (5) above.

Upon detection of the error in accordance with the error detection information through the delay circuit 300, a power calculating circuit 185 calculates power Q of a one-frame reproduced signal s(n), as an output 224 from the synthesizing filter 170, for a predetermined number of frames, and outputs the calculation result to the gain control circuit 168 through a line 222. The power Q is given by $$Q = \sum_{n=1}^{N} s^2(n) \qquad (8)$$

where N is the number of samples in one frame.

Upon detection of the error in accordance with the error detection information through the delay circuit 300, a weighting circuit 175 weights a coefficient for the synthesizing filter 170 for a predetermined number of frames according to equation (3), and outputs the weighted coefficient to the synthesizing filter 170 through a line 223.

The present invention can be applied to known methods other than the CELP method in the embodiments.

In addition, if the power of a speech signal linear prediction difference signal or an RMS is transmitted as transmission information in place of the power information of speech, interpolation of the power information of speech in the interpolating circuit 110 is performed in the following manner. If the values of the power of a difference signal received in the (L−1)th and (L+1)th frames are respectively represented by $Pd_{L-1}$ and $Pd_{L+1}$, power $P_{L-1}$ of (L-1)th-frame speech is predicted by the following equation:

$$P_{L-1} = Pd_{L-1}/\sum_{i=1}^{R}(1 - K_i^2) \qquad (9)$$

where $K_i$ is the ith PARCOR coefficient which can be obtained from a linear prediction coefficient $a_i$ by a known method. Similarly, the power of the difference signal in the (L+1)th frame is obtained according to equation (9). The values $P_{L-1}$ and $P_{L+1}$ are substituted into equation (3) to calculate a power interpolated value in the Lth frame.

In the interpolating circuit 110, parameters other than those described in the above embodiment, e.g., a pitch gain and the gain of a power source codebook, can be interpolated in a frame in which an error is detected.

Furthermore, in the embodiment shown in FIG. 2, gain control in he gain control circuit 168 may be performed for the reproduced signal s(n) as an output from the synthesizing filter 170 instead of a power source signal In this case, gain control of the signal s(n) is performed according to equation (7).

In the embodiment in FIG. 2, weighting of a filter coefficient in the weighting circuit 175 or gain control in the gain control circuit 168 may be performed from the instant at which an error is detected to the instant at which a predetermined condition is satisfied For example, the predetermined condition is satisfied when the gain of an adaptive codebook 120 becomes smaller than a predetermined threshold value or when the value of speech power or an RMS becomes smaller than a predetermined value.

Weighting of a filter coefficient may be performed, upon detection of an error, only in a frame in which a prediction gain is large. In this case, a prediction gain $G_p$ is given by $$G_p = 1/\sum_{i=1}^{R}(1 - K_i^2) \qquad (10)$$

As has been described above, according to the present invention, on the reception side, in a frame in which an error is detected, important transmission parameters are interpolated and recovered by using parameters in past and future proper frames, thus reproducing speech. Therefore, in comparison with the conventional method of repeatedly using parameters in a past proper frame, high-quality speech can be provided with only a slight deterioration in sound quality due to errors.

What is claimed is:

1. A speech decoder comprising:
  separating means for separating a code string of a filer parameter, a code string of a parameter associated with a pitch, and a code string of a parameter associated with an index and a gain of a codebook representing an excitation signal of speech from a received code string;
  error correction decoding means for detecting a transmission error, which cannot be corrected, in the received code string;
  interpolating means for, when a transmission error which cannot be corrected is detected, interpolating between parameters of past and further proper frames, thereby recovering parameters of a current frame; and
  speech reproducing means for reproducing a speech signal on the basis of the interpolated parameters and other received codes,
  further comprising weighting means for, when a transmission error which cannot be corrected is detected in a received code string, weighting a filter parameter in a predetermined number of frames starting from a frame in which the error is detected.

2. A speech decoder comprising:
  separating means for separating a code spring of a filter parameter, a code string of a parameter associated with a pitch, and a code string of a parameter associated with an index and a gain of a codebook representing an excitation signal of speech from a received code string;

error correction decoding means for detecting a transmission error, which cannot be corrected, in the received code string;

interpolating means for, when a transmission error which cannot be corrected is detected, interpolating between parameters of past and future proper frames, thereby recovering parameters of a current frame; and speech reproducing means of reproducing a speech signal on the basis of the interpolated parameters and other recited codes, further comprising weighting means for, when a transmission error which cannot be corrected is detected in a received code string, weighting a filer parameter until a predetermined condition is satisfied.

3. A speech decoder comprising:

separating means for separating a code string of a filter parameter, a code string of a parameter associated with a pitch, and a code string of a parameter associated with an index and a gain of a codebook representing an excitation signal of speech from a received code string;

error correction decoding means for detecting a transmission error, which cannot be corrected, in the received code string;

interpolating means for, when a transmission error which cannot be corrected is detected, interpolating between parameters of past and future proper frames, thereby recovering parameters of a current fame; and speech reproducing means for reproducing a speech signal on the basis of the interpolated parameters and other received codes, further comprising gain control means for, when a transmission error which cannot be corrected is detected in a received code string, and a value of a reproduced signal exceeds a predetermined threshold value, controlling a gain of an excitation signal or the reproduced signal in a predetermined number of frames starting from a frame in which the error is detected.

4. A speech decoder comprising:

separating means for separating a code string of a filter parameter, a code string of a parameter associated with a pitch, and a code string of a parameters associated with an index and a gain of a codebook representing an excitation signal of speech from a received code string;

error correction decoding means for detecting a transmission error, which cannot be corrected, in the received code string;

interpolating means for, when a transmission error which cannot be corrected is detected, interpolating between parameters of past and future proper frames thereby recovering parameters of a current frame; and speech reproducing means for reproducing a speech signal on the basis of the interpolate parameters and other received codes, further comprising gain control means for, when a transmission error which cannot be corrected is detected in a received code string, and a value of a reproduced signal exceeds a predetermined threshold value, controlling a gain of an excitation signal or the reproduced signal until a predetermined condition is satisfied.

* * * * *